United States Patent [19]
Delikat

[11] 4,001,880
[45] Jan. 4, 1977

[54] AUDIO TO VIDEO TRANSLATOR

[76] Inventor: Robert P. Delikat, 8516 Big Rock Road, Santee, Calif. 92071

[22] Filed: June 23, 1975

[21] Appl. No.: 589,438

[52] U.S. Cl. .................................. 358/81; 358/33; 358/82; 358/144

[51] Int. Cl.² ...................... H04N 5/38; H04N 9/00

[58] Field of Search ...................... 358/82, 81, 33; 179/1 SP; 178/5.8 R

[56] References Cited
UNITED STATES PATENTS

| | | | |
|---|---|---|---|
| 2,804,500 | 8/1957 | Giacoletto | 358/82 X |
| 2,874,212 | 2/1959 | Bechley | 358/82 |
| 3,551,589 | 12/1970 | Moskovitz | 358/82 |
| 3,604,852 | 9/1971 | Weintraub | 358/82 X |
| 3,627,912 | 12/1971 | Hearn | 358/82 |
| 3,723,652 | 3/1973 | Alles et al. | 358/82 X |
| 3,900,886 | 8/1975 | Coyle et al. | 358/82 |

Primary Examiner—Robert L. Richardson
Assistant Examiner—Mitchell Saffian

[57] ABSTRACT

An audio to video translator in which an RF oscillator having a frequency within the commercial television broadcast band is coupled to the antenna terminals of a commercial home television receiver and tuned to the selected channel with no other antenna terminal input. The RF oscillator is modulated with vertical and horizontal sync pulses together with the outputs of a color oscillator which in turn is modulated by incoming audio such as from a standard stereo receiver tape deck or record player. Blanking and unblanking pulses from the output of a video generator also modulate the RF oscillator, the video generator being frequency modulated by outputs from the sync pulse generators and the audio channels.

5 Claims, 2 Drawing Figures

AUDIO TO VIDEO TRANSLATOR

BRIEF DESCRIPTION OF THE INVENTION

The present invention relates to an audio video translator and more particularly to an audio to video translator for effecting a video television display from an audio music source.

According to the invention an audio to video translator is provided which has input terminals for coupling to a sound source which is preferrably stereophonic and an output terminal for coupling to a home commercial television receiver antenna. The translator is tuned to a selected channel of the television set, the translator containing a carrier oscillator which is tunable to that channel. The carrier oscillator is modulated with sync pulses within the translator and blanking and unblanking pulses and color signals. The blanking and unblanking pulses together with the color signal are premodulated with the horizontal and vertical sync pulses together with the audio source. Hence, a video dispay derived from an audio source such as a multiplexed FM receiver, a stereo tape deck or a stereo record player is provided for simultaneous viewing and listening if desired.

An object of the present invention is the provision of an audio to video translator for effecting a video display in conjunction with an audio signal.

Another object of the invention is the provision of an audio to video translator which can translate a convenient audio source to a video presentation on a standard television screen.

A further object of the invention is the provision of an audio to video translator for translating an audio source into a video color presentation on a standard television color receiver.

Other objects and many of the attendant advantages of the present invention will be readily appreciated as the same becomes better understood by reference to the following detailed description when considered in connection with the accompanying drawings in which like reference numerals designate like parts throughout the Figures thereon and wherein:

FIG. 1 is a block diagram of the preferred embodiment of the present invention; and FIG. 2 is a schematic diagram of the video generator of the embodiment of FIG. 1.

DETAILED DESCRIPTION OF THE DRAWING

Figure 1:
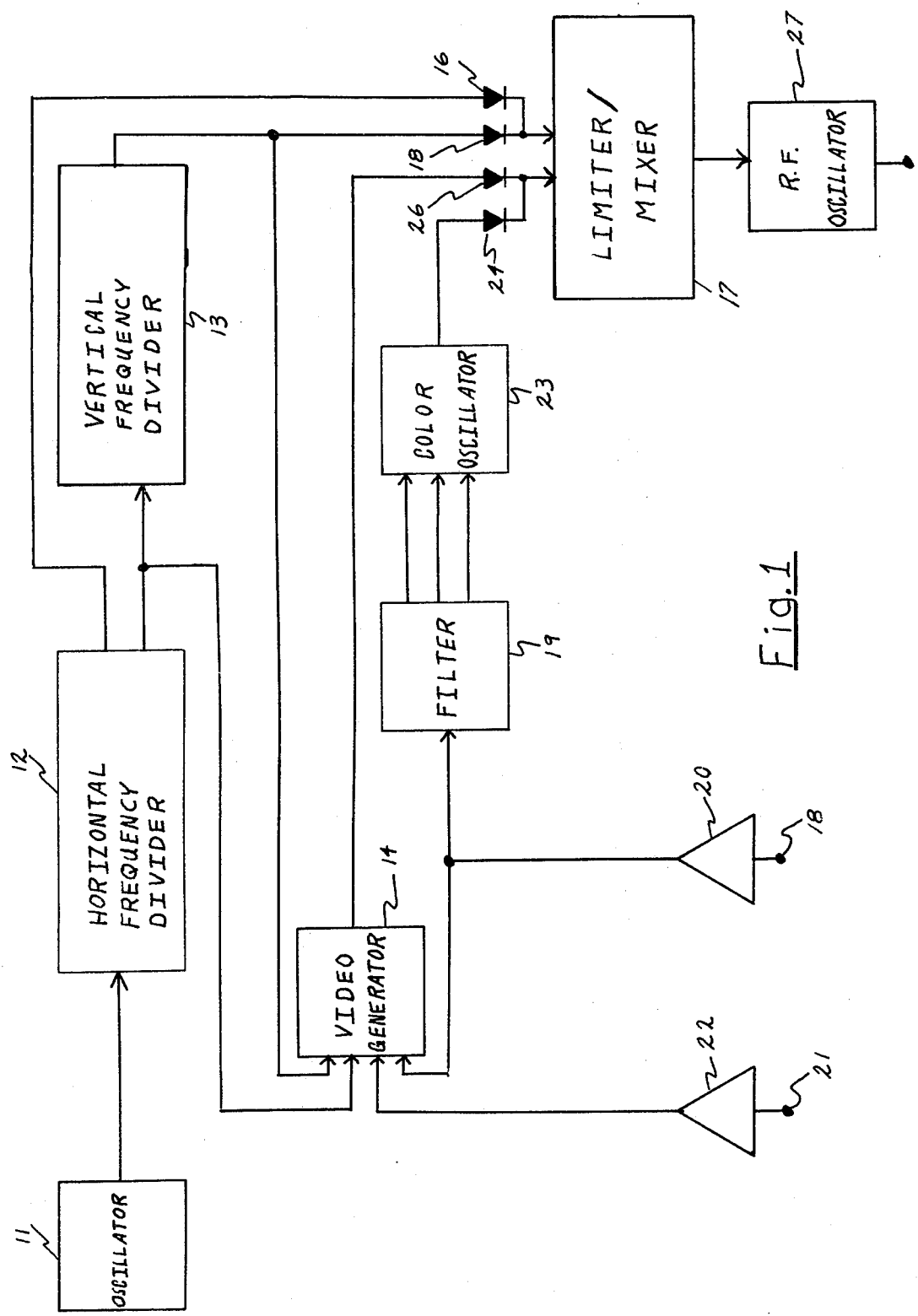

Referring to FIG 1, oscillator 11 is coupled to horizontal frequency divider 12 which in turn has one output coupled to an input of vertical frequency divider 13 and to one input of video generator 14. Horizontal frequency divider has another output coupled through diode 16 to one input of limited mixer 17. Vertical frequency divider 13 has an output coupled through diode 18 to an input of limited mixer 17, the other sides of diode 16 and 18 being coupled together. Input terminal 18 is coupled to filter 19 and to another input of video generator 14. Input terminal 21 is coupled through amplifier 22 to still another input of video generator 14. The three outputs of filter 19 are coupled to a modulation input of color oscillator 23 the output of which is coupled through diode 24 to a second input of limited mixer 17. The output of video generator 14 is coupled through diode 26 to said second input of limited mixer 17. Limited mixer 17 has an output coupled to a modulation input of RF oscillator 27.

Figure 2:
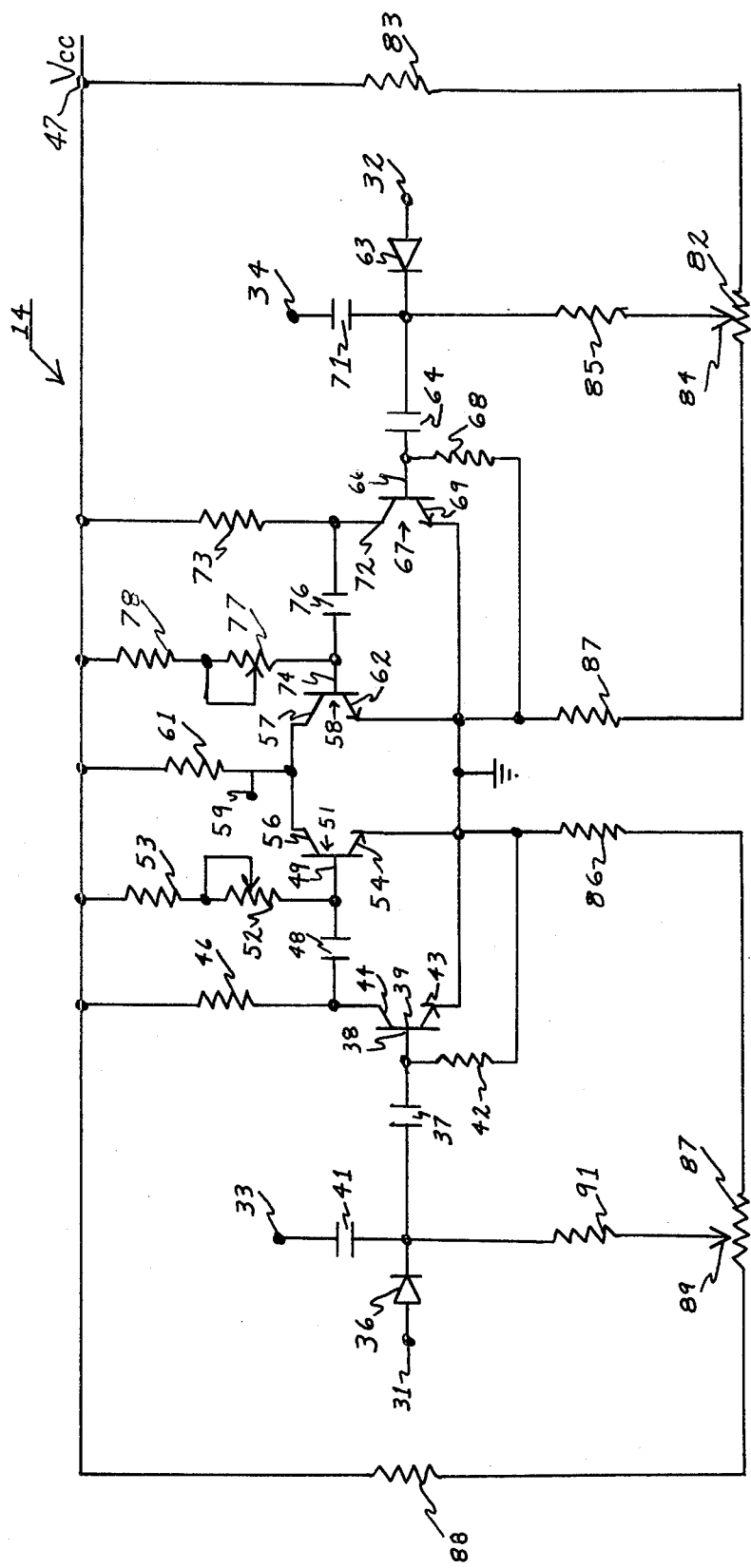

Referring to FIG. 2, the schematic diagram of video generator 14 is shown having an input 31 from horizontal frequency divider 12 (FIG. 1), an input 32 from vertical frequency divider 13 (FIG. 1), an input 33 from amplifier 22 (FIG. 1), and an input 34 from amplifier 20 (FIG. 1). Input terminal 31 is coupled through diode 36 and capacitor 37 to base 38 of transistor 39. Input 33 is coupled through capacitor 41 and capacitor 37 to base 38 to transistor 39. Base 38 is also connected through resistance 42 to ground. Emitter 43 of transister 39 is also connected to ground. Collector 44 of transistor 39 is connected through resistance 46 to VCC terminal 47. Collector 44 is also coupled through capacitance 48 to base 49 of transister 51. Base 49 is also connected through variable resistance 52 and resistance 53 in series to VCC terminal 47. Emitter 54 of transistor 51 is connected to ground. Collector 56 of transistor 54 and collector 57 of transistor 58 are coupled together, to output terminal 59 and through resistance 61 to VCC terminal 47. Emitter 62 of transister 58 is connected to ground. Input terminal 32 is connected through diode 63 and capacitance 64 to base 66 of transister 67. Base 66 is connected through resistance 68 to ground. Emitter 69 of transistor 67 is connected to ground. Input terminal 34 is connected through capacitance 71 and capacitance 64 to base 66 of transistor 67. Collector 72 of transistor 67 is connected through resistance 73 to VCC terminal 47 and base 74 of transistor 58 is connected through capacitance 76 to collector 72 and through variable resistance 77 and resistance 78 in serial relationship to VCC terminal 47. Resistance 81 is connected from ground through resistance 82 and 83 in serial relationship to VCC terminal 47. Sliding contact 84 on resistance 82 is connected through resistance 85 to the junction of capacitances 64 and 71 and diode 63. Resistance 86 is connected from ground through resistance 87 and 88 in series to VCC terminal 47. Sliding contact 89 on resistance 87 is connected through resistance 91 to the junction of capacitances 37 and 41 and diode 36.

OPERATION

Quiescently, oscillator 11 typically oscillates at 188.8 kilohertz with its output being divided in horizontal frequency divider 12 to 15.733 kilohertz which is the horizontal sync frequency and is supplied through diode 16 to limited mixer 17 modulating RF oscillator 27. This output is also further divided in vertical frequency divider 13 to a frequency of 6.004 kilohertz which is supplied through diode 18 to limited mixer 17 and also modulates RF oscillator 27. Hence, the vertical and horizontal sync signals are present on the carrier input to a television receiver. The outputs of horizontal frequency divider 12 and vertical frequency divider 13 are also passed into video generator 14 which results in a blanking and unblanking signal at its output which is coupled through diode 26 and similarly through limited mixer 17 to modulate the RF oscillator 27 for video blanking and unblanking.

When audio signals in stereophonic relationship are presented at input terminals 18 and 21 the blanking and unblanking output of video generator 14 is further varied which will be discussed with reference to FIG. 2. One side; i.e., the audio signal at input terminal 18, is passed through a filter 19 which separates the signal into one of three outputs depending upon the frequency of the audio at any given instant. These three ouputs are coupled to color oscillator 23 any one or more of which modulate color oscillator 23 which in turn has an output coupled through diode 24 and limited mixer 17 to further modulate RF oscillator 28. This modulation will determine which color is displayed on a color television receiver at any given instant. Hence, with a simple connection to a stereo audio source a color video display is effected on a standard color television receiver. It is pointed out that a monophonic source can be utilized at terminal 18 if a stereo source is not available and that the system can be utilized on a black and white television receiver which of course would not utilize the modulation from color oscillator 23.

Referring to FIG. 2, quiescently, transisters 39 and 67 are zero biased through resistances 42 and 68 respectively and hence, are not conducting. Transisters 51 and 58 are forward biased and are heavily conducting. This substantially places output terminal 59 at zero potential. When horizontal sync pulses arrive at terminal 31 from horizontal frequency divider 12 they are coupled through capcitance 37 to base 38 and being positive drive transister 39 into conduction cutting off transister 51 and raising the output voltage at terminal 59. This, due to the time constant of resistances 52, 53, and capacitance 49 being relatively large transister 51 is held cut off for a typical period of 70 microseconds. This is variable through variable resistance 52 and effects a width control of the unblanking pulse at output terminal 59. The input at terminal 32 coming from vertical frequency divider 13 at a much lower frequency together with the time constant of capacitance 76 and resistances 77 and 78 being much smaller than the time constant of resistances 52 and 53 and capacitance 48 result in this signal appearing as a height control which is variable by varying the resistance of variable resistance 77. Typical values of these components are as follows:

R Resistance 53: 27,000 ohms
Resistance 52: 60,000 ohms
Capacitance 48: 120 picofarrads
Resistance 11: resistance 78: 10,000 ohms
Resistance 77: 12,000 ohms
Capacitance 64: 0.01 microfarrads Hence, the output at terminal 59 will be a square wave modulated in width by horizontal sync input 31 and amplitude by vertical sync input 32. Further modulation of this output is effected via the audio inputs at terminals 33 and 34. Sliding contact 89 on resistance 87 effects a horizontal start time and sliding contact 84 on resistance 82 effects a vertical start time.

Since the remainder of the components of FIG. 1 are deemed to be standard and well within the competence of one skilled in the television electronic arts, a further schematic break-down is deemed unnecessary and undesirable.

It should be understood, of course, that the foregoing disclosure relates to only a preferred embodiment of the invention, and that it is intended to cover all changes and modifications of the example of the invention herein chosen, for the purposes of the disclosure, which do not constitute departures from the spirit and scope of the invention.

The invention claimed is:
1. An audio to video translator comprising:
   a radio frequency oscillator, said radio frequency oscillator being tunable to at least one predetermined television channel frequency;
   vertical and horizontal sync pulse generator means coupled to said oscillator for modulation thereof;
   a video generator having at least first, second and third inputs and an output, said horizontal and vertical sync pulse generator means coupled to said first and second video generator inputs, respectively, and said video generator output coupled to said oscillator for blanking and unblanking modulation thereof; and
   an audio signal coupled to said third video generator input for varying said blanking and unblanking modulation of said oscillator.
2. The audio to video translator of claim 1 and further including a fourth input to said video generator, said fourth input being coupled to an audio source in stereophonic relationship with said first mentioned audio source.
3. The audio to video translator of claim 1 and further including:
   a color oscillator having an output coupled to said radio frequency oscillator for color modulation thereof, said audio signal being coupled to said color oscillator for modulation thereof.
4. The audio to video translator of claim 3 and further including:
   a fouth input to said video generator, said fourth input being coupled to an audio source in stereophonic relationship with said first mentioned audio source.
5. An audio to video translator comprising:
   a radio frequency oscillator, said radio frequency oscillator being tunable to at least one predetermined television channel frequency;
   vertical and horizontal sync pulse generator means coupled to said oscillator for modulation thereof;
   a video generator having at least, first, second and third inputs and an output, said horizontal and vertical sync pulse generator means coupled to said first and second video generator inputs, respectively, and said video generator output coupled to said oscillator for blanking and unblanking modulation thereof;
   an audio signal coupled to said third video generator input for varying said blanking and unblanking modulation of said oscillator; and
   a color oscillator having an output coupled to said radio frequency oscillator for color modulation thereof, said audio signal being coupled to said color oscillator for modulation thereof.

* * * * *